US008671152B2

(12) United States Patent
Horie et al.

(10) Patent No.: US 8,671,152 B2
(45) Date of Patent: Mar. 11, 2014

(54) NETWORK PROCESSOR SYSTEM AND NETWORK PROTOCOL PROCESSING METHOD

(75) Inventors: Kazuyoshi Horie, Tokyo (JP);
Kazutaka Tachibana, Hokkaido (JP);
Taku Tanaka, Hokkaido (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 1537 days.

(21) Appl. No.: 11/774,998

(22) Filed: Jul. 9, 2007

(65) Prior Publication Data

US 2008/0013448 A1 Jan. 17, 2008

(30) Foreign Application Priority Data

Jul. 11, 2006 (JP) ................................. 2006-190053

(51) Int. Cl.
*G06F 15/167* (2006.01)
*G06F 11/00* (2006.01)
*G06F 15/16* (2006.01)

(52) U.S. Cl.
USPC ............................ 709/212; 370/229; 709/250

(58) Field of Classification Search
USPC .......... 709/250, 220, 223, 228, 238; 370/229, 370/258, 469
See application file for complete search history.

(56) References Cited

U.S. PATENT DOCUMENTS

| 7,457,861 | B1* | 11/2008 | Ebersole et al. | 709/223 |
| 7,631,107 | B2 | 12/2009 | Pandya | |
| 2002/0059451 | A1* | 5/2002 | Haviv | 709/238 |
| 2004/0037319 | A1* | 2/2004 | Pandya | 370/469 |
| 2004/0210320 | A1 | 10/2004 | Pandya | |
| 2005/0015469 | A1* | 1/2005 | Zuberi | 709/220 |
| 2005/0080923 | A1* | 4/2005 | Elzur | 709/238 |
| 2006/0129676 | A1* | 6/2006 | Modi et al. | 709/227 |

FOREIGN PATENT DOCUMENTS

| WO | 2005114339 A2 | 12/2005 |
| WO | 2006055691 A2 | 5/2006 |

OTHER PUBLICATIONS

Office Action for corresponding Japanese Patent application No. 2006-190053, dated Jun. 28, 2011.
Office Action for corresponding Japanese Patent Application No. 2006-190053, dated Feb. 14, 2012.

* cited by examiner

*Primary Examiner* — David X Yi
(74) *Attorney, Agent, or Firm* — Matthew B. Dernier, Esq.; Gibson & Dernier LLP

(57) ABSTRACT

A multiprocessor system is provided for emulating remote direct memory access (RDMA) functions. The first sub-processing unit (SPU) generates a message to be transmitted. The second SPU is a processor for emulating the RDMA functions. Upon receiving a notification from the first SPU, the second SPU synthesizes the message into a packet according to a RDMA protocol. The third SPU is a processor for performing a TCP/IP protocol processing. Upon receiving a notification from the second SPU, the third SPU synthesizes the packet generated according to the RDMA protocol into a TCP/IP packet and then sends it out from a network interface card.

8 Claims, 14 Drawing Sheets

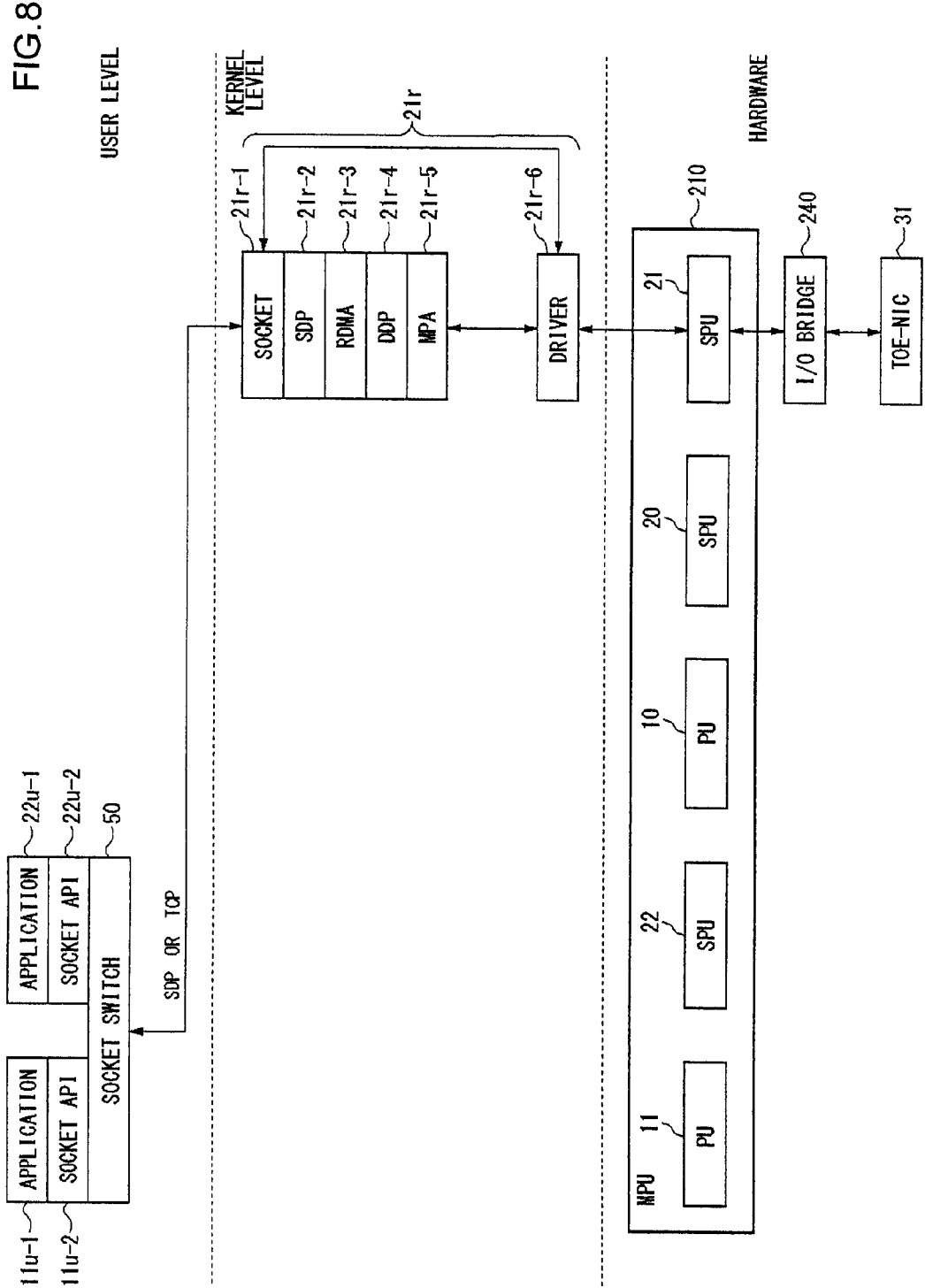

NETWORK PROCESSOR SYSTEM AND NETWORK PROTOCOL PROCESSING METHOD

BACKGROUND OF THE INVENTION

1. Field of the Invention

The present invention relates to a network processor system and a network protocol processing method.

2. Description of the Related Art

Recent advances in network technology promote the wide use of Gigabit network so that the bandwidth of the network has remarkably expanded. On the other hand, it is a current status that the processing performance of a microprocessor that processes packets transmitted through the network has not improved as much as the network performance. Therefore it is difficult for the microprocessor to process the packet transmitted through a high-speed network at a sufficient speed. Particularly, the processing performance of the microprocessor will become a bottleneck for the network bandwidth when the bandwidth of the network exceeds around one Giga bit per second (Gbps).

There are the following three causes that the processing performance of the processor will become a bottleneck:

(1) transmission control protocol (TCP) processing;
(2) context switch; and
(3) memory-to-memory copy.

The TCP processing as listed above is composed of some processes that require a large amount of computation such as checksum and retransmission, resulting in putting a heavy load on the processor. A TCP offload engine (TOE) is a technology to solve this problem. To employ this technology, a dedicated hardware for performing the processes in TCP is implemented in a network interface card (NIC). A network interface card in which such a TCP offload engine is implemented is called a TOE-NIC. In this case, a send/receive buffer will be provided inside the TOE-NIC.

The context switch as listed above occurs when the context for processing packets is switched between a user mode and a kernel mode. Since the context switch produces overhead, it will become a bottleneck for the overall processing performance. To solve this problem, an implementation technique has been researched such as a kernel bypass in which the protocol processing by a kernel is skipped.

The memory-to-memory copy as listed above occurs when data of a packet is copied between a plurality of memories in the course of the packet processing. First, the network interface card writes a received packet to a buffer of the kernel. The CPU analyzes the packet stored in the buffer of the kernel and then writes it to a buffer of an application. In the course of this processing, the data of the packet is copied from the kernel buffer to the application buffer. This memory-to-memory copy produces some overhead.

A technique called a remote direct memory access (RDMA) has been implemented to solve the problem when the memory-to-memory copy occurs. Direct memory access (DMA) is a method for directly transferring data between various types of devices and a random access memory (RAM). The RDMA extends this DMA functionality across a network. The RDMA allows the data to directly move from a memory in one computer to a memory in another computer, resulting in reducing the CPU overhead. In the case of a TCP/IP network, a RDMA-enabled NIC (RNIC) is necessary to utilize the RDMA. In general, the RNIC is a network interface card that has both TOE and RDMA functionalities.

It is an important issue for improving the efficiency of communication how to reduce a processing load on the microprocessor so as to cope with the network operating at an increasingly higher speed in the future. The above-mentioned RDMA is one of the solutions for this problem. However, in order to utilize the RDMA, a dedicated network interface card conforming to RDMA, or RNIC is needed. The conventional network interface cards that have been used in a normal situation are useless to utilize the RDMA. It costs a lot to replace all existing NICs by RNICs conforming to RDMA. This is a cause that the spread of the RDMA technology has been delayed.

Furthermore, if only a part of network interface cards are replaced by RDMA-enabled cards and the network is configured in such a manner that the conventional NICs and the RNICs coexist, another problem might occur in which the communication between the conventional NICs and the RNICs becomes impossible.

SUMMARY OF THE INVENTION

Accordingly, a general purpose of the present invention is to provide an efficient communication technology that necessitates RDMA functionality.

According to at least one embodiment of the present invention, a network processor system is provided. The network processor system includes: a first processor which is operable to emulate a remote direct access function; a buffer which queues a packet generated by the first processor according to a remote direct memory access protocol; a second processor which is operable to read the packet queued in the buffer so as to perform a TCP/IP protocol processing thereon; and a network interface card which transmits a TCP/IP packet generated by the second processor to a network.

According to another embodiment of the present invention, a network processor system is also provided. The network processor system includes: a first processor adapted to perform a processing at a user level, the first processor being operable to generate a message to be transmitted in a user space; a second processor adapted to emulate a remote direct memory access function at a kernel level, the second processor being operable to synthesize the message into a packet according to a remote direct memory access protocol upon receiving a notification from the first processor; a buffer which queues the packet thus generated by the second processor according to the remote direct memory access protocol; a third processor adapted to perform a TCP/IP protocol processing at a kernel level, the third processor being operable to read the packet queued in the buffer upon receiving a notification from the second processor so as to synthesize the read packet into a TCP/IP packet according to a TCP/IP protocol; and a network interface card which transmits the TCP/IP packet thus generated by the third processor to a network.

According to yet another embodiment of the present invention, a network processor system is also provided. The network processor system includes: a processor adapted to emulate a remote direct memory access function; a buffer which queues a packet generated by the processor according to a remote direct memory access protocol; and a network interface card which has a TCP/IP offload function for reading the packet from the buffer so as to perform a TCP/IP protocol processing thereon.

According to yet another embodiment of the present invention, a network processor system is also provided. The network processor system includes: a first processor adapted to perform a process at a user level, the first processor being operable to generate a message to be transmitted in a user space; a second processor adapted to emulate a remote direct memory access function at a kernel level, the second processor being operable to synthesize the message into a packet according to a remote direct memory access protocol upon receiving a notification from the first processor; a buffer which queues the packet thus generated by the second processor according to the remote direct memory access protocol; and a network interface card which has a TCP/IP offload function for reading the packet queued in the buffer upon receiving a notification from the second processor so as to perform a TCP/IP protocol processing thereon.

According to yet another embodiment of the present invention, a network processor system is also provided. The network processor system includes: a first processor adapted to emulate a remote direct memory access function; a buffer which queues a packet generated by the first processor according to the remote direct memory access protocol; a second processor operable to read the packet queued in the buffer so as to perform a TCP/IP protocol processing thereon; a first network interface card which transmits a TCP/IP packet thus generated by the second processor to a network; and a second network interface card which has a TCP/IP offload function for reading the packet queued in the buffer so as to perform a TCP/IP protocol processing thereon. The first processor has a function for referring to a table which associates a destination IP address of the packet with a MAC address either of the first or the second network interface card so as to switch a network interface for transmitting the packet between the first and the second network interface cards depending on the destination IP address. The packet is subject to a TCP/IP protocol processing by the second processor and transmitted from the first network interface card if the packet is directed to the first network interface card, while the packet is subject to a TCP/IP protocol processing by the TCP/IP offload function of the second network interface card and transmitted from the second network interface card if the packet is directed to the second network interface card.

According to yet another embodiment of the present invention, a network protocol processing method is provided. This method includes: making a first processor execute generating a message to be transmitted in a user space, the first processor being adapted to perform a process at a user level; making a second processor execute synthesizing the message into a packet according to a remote direct memory access protocol upon receiving a notification from the first processor, and queuing the packet thus generated into a buffer, the second processor being adapted to emulate a remote direct memory access function at a kernel level; and making a third processor execute reading the packet queued in the buffer upon receiving a notification from the second processor so as to synthesize the read packet into a TCP/IP packet according to a TCP/IP protocol, the third processor being adapted to perform a TCP/IP protocol processing at a kernel level.

According to yet another embodiment of the present invention, a network protocol processing method is provided. The method includes: making a first processor execute generating a message to be transmitted in a user space, the first processor being adapted to perform a process at a user level; making a second processor execute synthesizing the message into a packet according to a remote direct memory access protocol upon receiving a notification from the first processor, and queuing the packet thus generated into a buffer, the second processor being adapted to emulate a remote direct memory access function at a kernel level; and making a third processor execute reading the packet queued in the buffer upon receiving a notification from the second processor so as to perform TCP/IP protocol processing thereon, the third processor being adapted to perform a TCP/IP offload function inside a network interface card.

Optional combinations of the aforementioned constituting elements, and implementations of the invention in the form of methods, apparatuses, systems, computer programs, program products, data structures, recording mediums, etc. may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 8 is a block diagram of the node according to the second embodiment example;

DETAILED DESCRIPTION OF THE INVENTION

The invention will now be described by reference to the preferred embodiments. This does not intend to limit the scope of the present invention, but to exemplify the invention.

In the following embodiments, the protocol processing is explained separately in a kernel mode and a user mode, however, this is only an example and it does not intend to limit the mode in which each protocol stack should be implemented. It is noted that the kernel and user modes are also called kernel and user levels respectively.

Furthermore, a processing element that performs RDMA functions is one processor in a multiprocessor system in the embodiments, however, a CPU installed in another chip may be used for solely performing the RDMA functions.

First Embodiment

Figure 1:
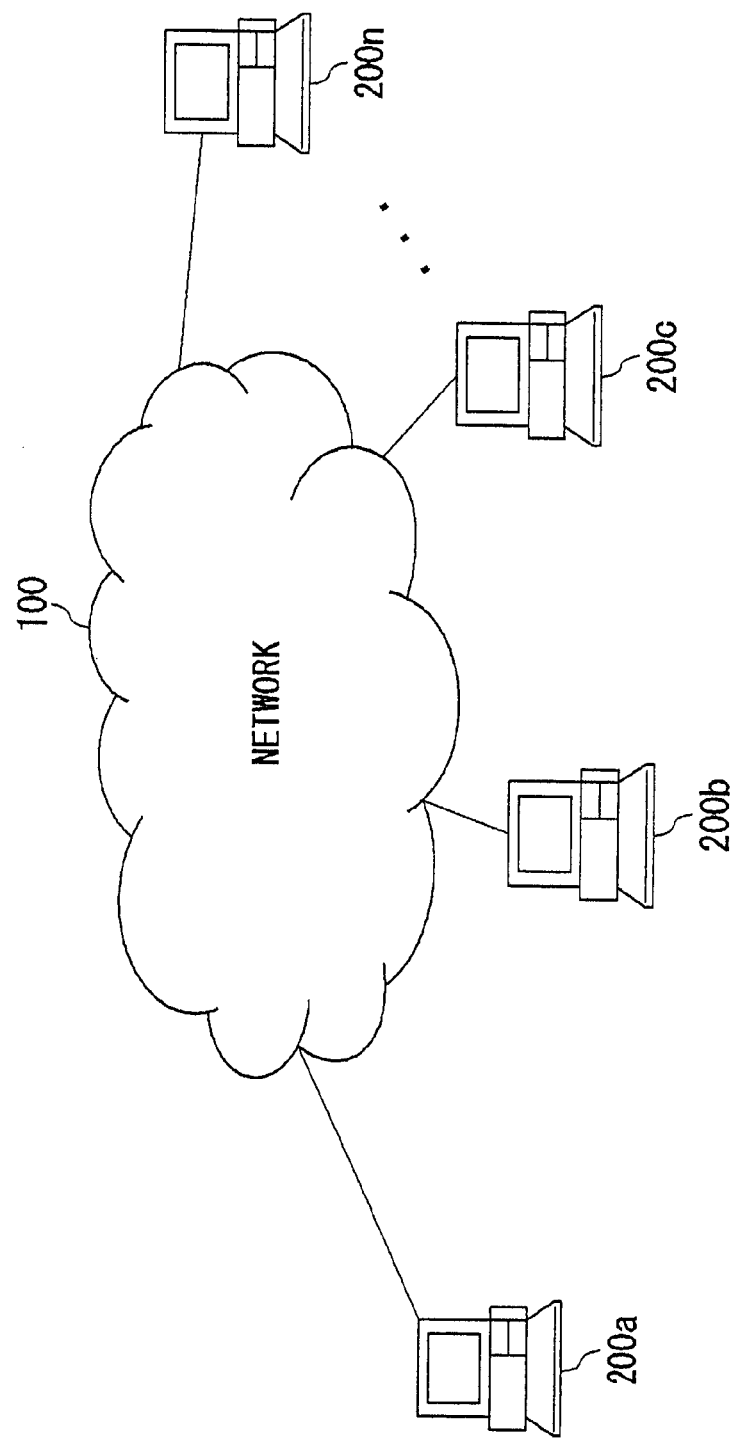
FIG. 1 shows a network system according to an embodiment of the present invention.

FIG. 1 shows a network system according to an embodiment of the present invention. A plurality of nodes 200a, 200b, 200c, . . . , and 200n are connected to a network 100. The nodes connected to the network 100 are hereinafter collectively or individually referred to as a node 200. The network 100 includes a router that transfers packets according to Internet Protocol (IP).

Figure 2:
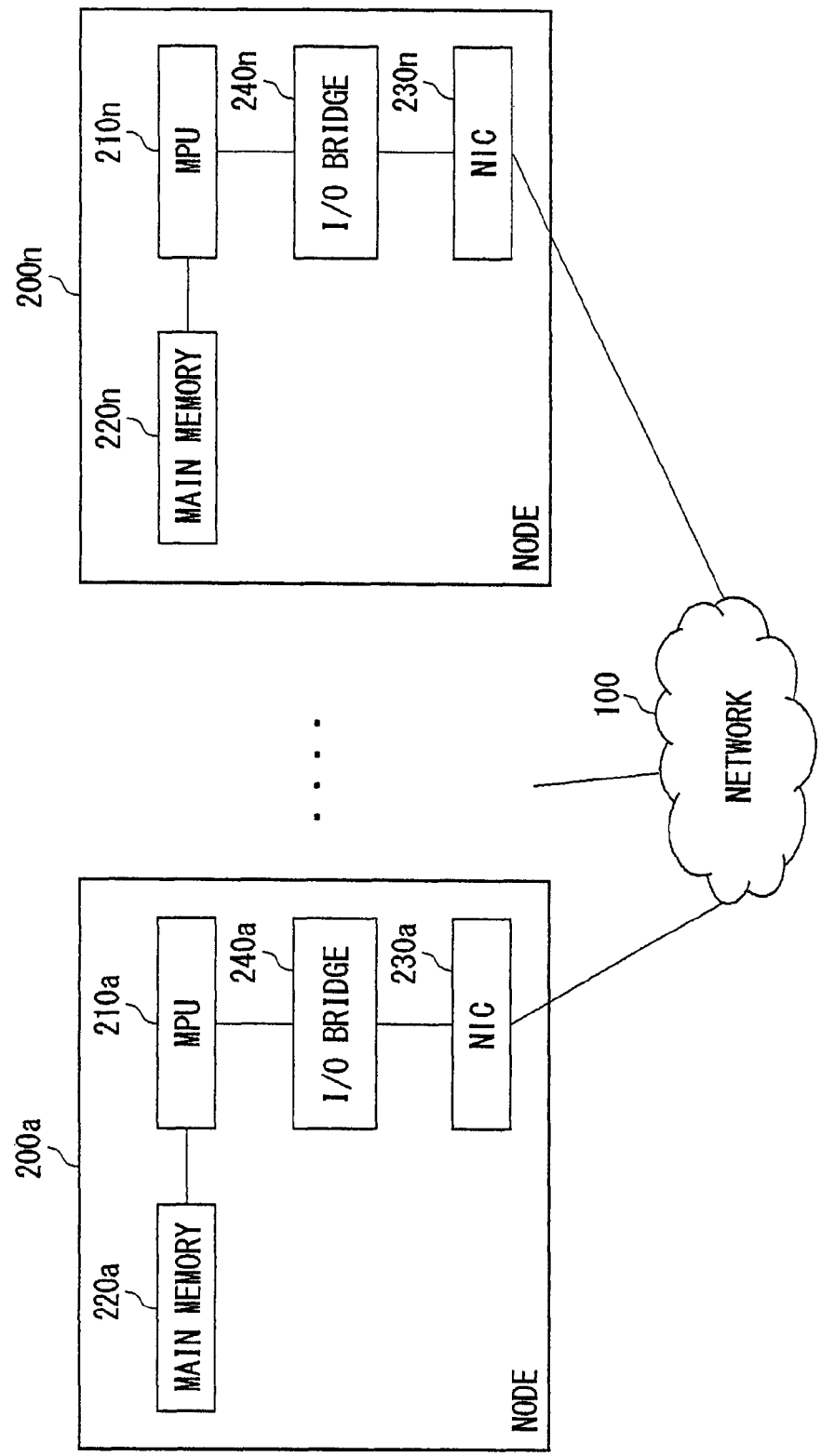
FIG. 2 is a block diagram of the node of FIG. 1.

FIG. 2 is a block diagram of the node 200 of FIG. 1. Each node 200 includes a micro processing unit (MPU) 210, a main memory 220, an I/O bridge 240, and a network interface card (NIC) 230.

The MPU 210 generates a packet in which a header information such as a destination address is added to data to be transmitted stored in the main memory 220. The MPU 210 passes the packet thus generated to a buffer in the NIC 230 through the I/O bridge 240. The NIC 230 sends out the packets stored in the buffer to the network 100.

The NIC 230 stores a packet received from the network 100 in the buffer and then passes the packet to the MPU 210 through the I/O bridge 240. The MPU 210 analyzes a header of the packet and stores data included in the packet in the main memory 220.

Figure 3:
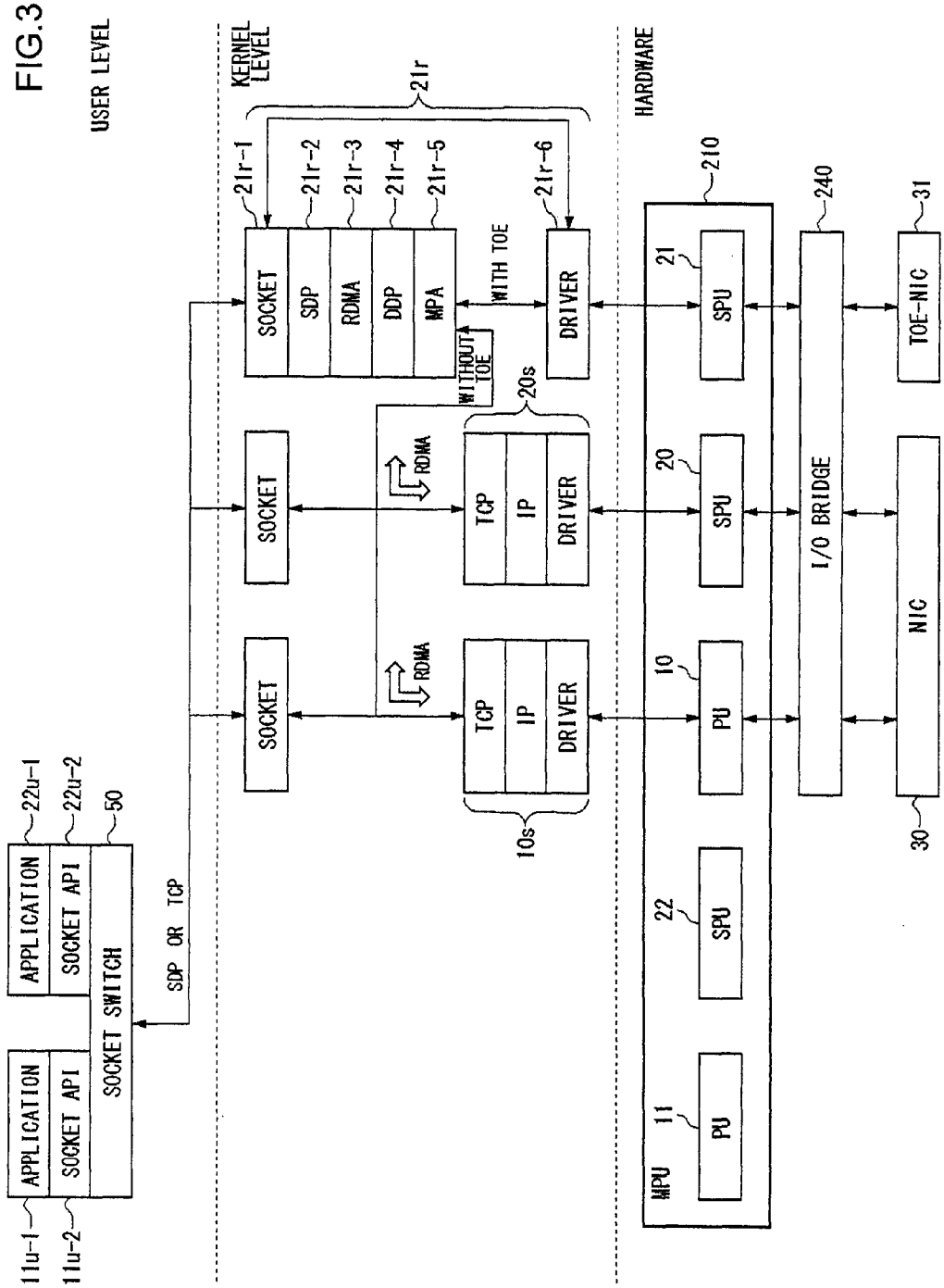
FIG. 3 illustrates a TCP/IP protocol stack and RDMA functions implemented in the MPU of the node of FIG. 2.

FIG. 3 illustrates a TCP/IP protocol stack and RDMA functions implemented in the MPU 210 of the node 200 of FIG. 2. These functions are preferably implemented by a combination of hardware and software and the software operates in a user mode and/or a kernel mode.

Each node 200 has the NIC 230 and MPU 210 as a hardware configuration. Either of NIC 30 without a TOE function or TOE-NIC 31 having a TOE function, or both of them are used as the NIC 230, as shown in the figure. The MPU 210 is herein configured as a multiprocessor including a processing unit (PU) and a sub-processing unit (SPU). Here, the PU and SPU are the processing elements that are different in their processing performance and configuration. As an example, the PU has a hardware cache mechanism for caching data of the main memory 220, while the SPU does not have a hardware cache mechanism but has a local memory.

The application program 11u-1, 22u-1, socket API 11u-2, 22u-2 and a socket switch 50 are software operating in a user mode. The socket switch 50 discriminates whether the protocol of a packet is a TCP or a socket direct protocol (SDP) so as to switch the destination to which the packet is forwarded. Here, SDP is a protocol for realizing the RDMA functions without altering an existing socket program. By the functionality of the socket switch 50, a packet that necessitates the RDMA functions is passed to a kernel level protocol stack 21 in which the RDMA functions are implemented, while a normal TCP packet that does not necessitate the RDMA functions is passed to a kernel level protocol stack 10s, 20s in which no RDMA functions are implemented.

There are the following three types of software operating in a kernel mode:

(1) TCP/IP protocol stack 10s operating on the PU 10;
(2) TCP/IP protocol stack 20s operating on the SPU 20; and
(3) RDMA protocol stack 21r operating on the SPU 21.

The RDMA protocol stack 21r includes a socket layer 21r-1 and a SDP layer 21r-2 to enable a RDMA operation without altering the existing socket program. In the RDMA layer 21r-3 below these layers, a RDMA command such as RDMA read or RDMA write is converted to a direct data placement (DDP) message. There is a DDP layer 21r-4 under the RDMA layer 21r-3. In the DDP layer 21r-4, the DDP message to be sent is divided into one or more DDP segments and the received DDP segments are reassembled into a DDP message.

There is a marker protocol-data-unit aligned (MPA) layer 21r-5 under the DDP layer 21r-4. In the MPA layer 21r-5, a backward marker is added at a fixed interval to the DDP segments. In this layer, a data length of the DDP segment and a cyclic redundancy check (CRC) for error detection are also added to each MPA segment. A TCP/IP protocol stack is implemented under the MPA layer 21r-5.

There are two methods for implementing the TCP/IP protocol stack: (a) implementing it as software operating in a kernel mode on the PU 10 or the SPU 20; and (b) implementing it as hardware providing a TCP offload engine (TOE) function in the TOE-NIC 31. In the latter case, the packet processed by the RDMA protocol stack 21r is passed through the device driver 21r-6, SPU 21 and I/O bridge 240 and then provided to the TOE-NIC 31. In the TOE-NIC 31, the packet is subject to the TCP/IP protocol processing by the TOE function and finally sent out to the network.

On the other hand, in the case of the NIC 30 with no TOE function, the TCP/IP protocol processing is done by using the TCP/IP protocol stack 10s, 20s implemented as software operating in a kernel mode on the PU 10 or the SPU 20.

The switching between the above-mentioned (a) implementation without a TOE function and (b) implementation with a TOE function is done by using information of a configuration file on startup of the system. Hereinafter, the structure and operations of the (a) implementation without a TOE function is explained as the first embodiment example, and the structure and operations of the (b) implementation with a TOE function is explained as the second embodiment example. Furthermore, the structure and operations in which both a normal NIC 30 with no TOE function and a TOE-NIC 31 with a TOE function are implemented in the node 200 is explained as the third embodiment example.

The RDMA protocol stack 21r and TCP/IP protocol stack 10s, 20s are basically resident and operating on each processor, however, the RDMA protocol stack 21r may be suspended while the RDMA function is not being used and instead the other process may operate. The same goes for the TCP/IP protocol stack 10s, 20s.

First Embodiment Example

Figure 4:
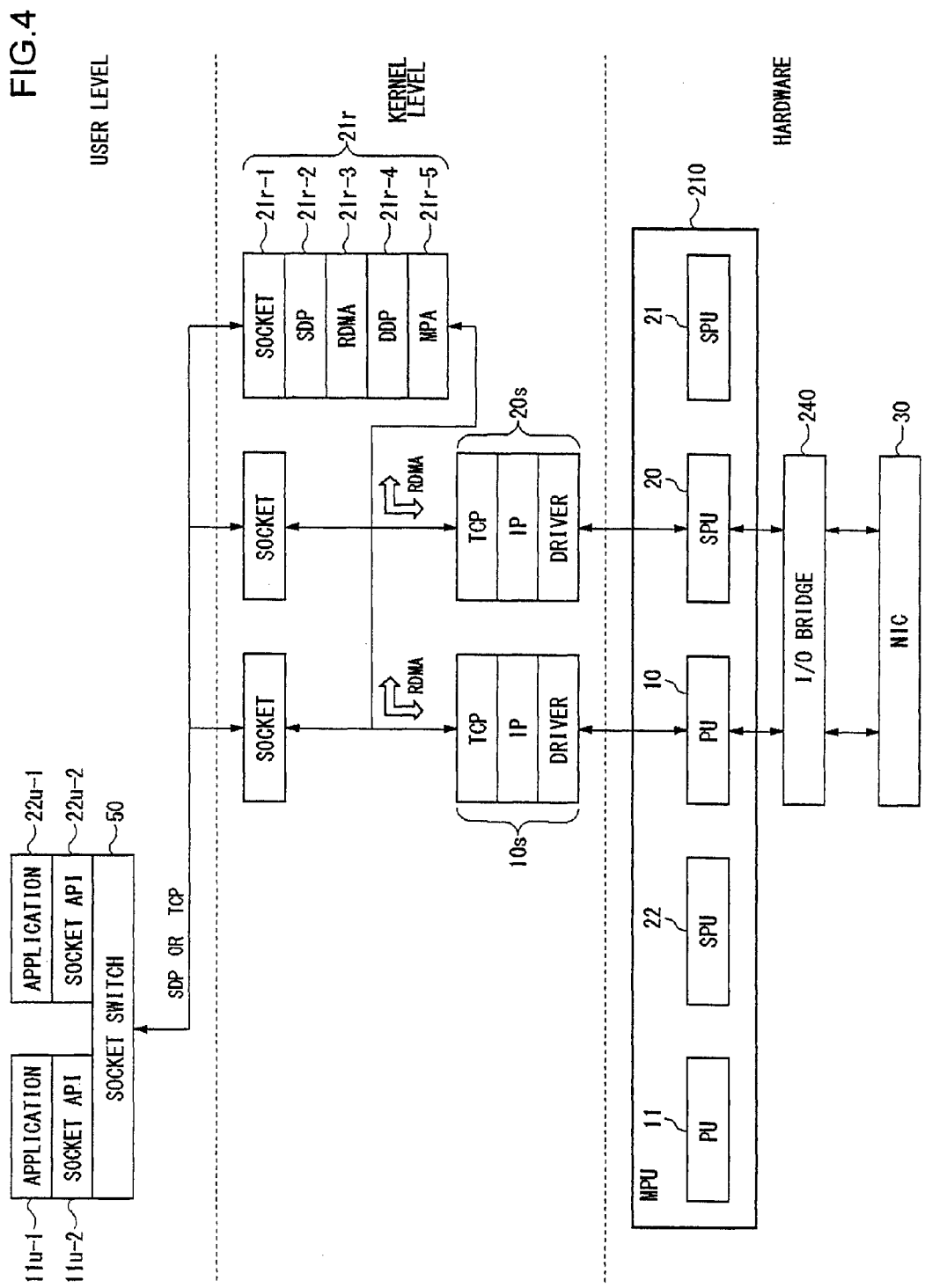
FIG. 4 is a block diagram of the node according to the first embodiment example.

FIG. 4 is a block diagram of the node 200 according to the first embodiment example. In the first embodiment example, the node 200 is equipped with a normal TOE-less NIC 30 and the NIC 30 is enabled to operate by the configuration on startup of the system. Here, the structure related to the TOE-NIC 31 that does not operate is not shown in the figure. In the first embodiment example, the TCP/IP protocol stack is implemented on the PU 10 or the SPU 20. The TCP/IP protocol stacks 10s, 20s respectively implemented on the PU 10 and the SPU 20 can operate simultaneously or either of these stacks may pause.

As an example of RDMA operations, a RDMA write is now explained. Assumes that a RDMA write is executed between the two nodes 200a and 200b of FIG. 1. The source node 200a issues a RDMA write command to the destination node 200b so as to transmit data to be RDMA written to the destination node 200b.

Figure 5:
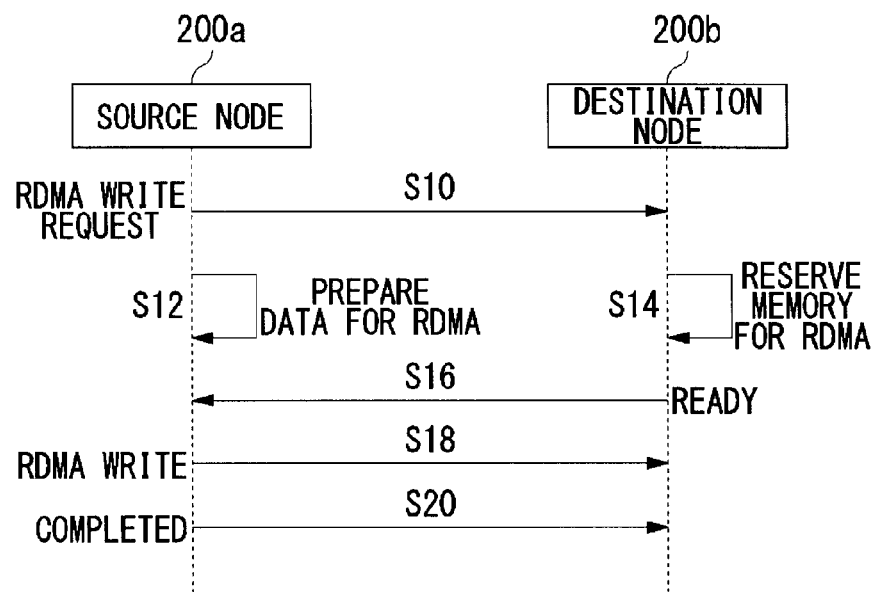
FIG. 5 is a sequence diagram of a RDMA write process executed between the source node and the destination node of the first embodiment example.

FIG. 5 is a sequence diagram of a RDMA write process executed between the source node 200a and the destination node 200b. First, a request for RDMA write is issued from the source node 200a to the destination node 200b (S10). At the time of this request, information such as the size of data to be RDMA written is transmitted. Then, the source node 200a prepares the data to be RDMA written in the main memory 220a of this node (S12).

On the other hand, upon receiving the request for RDMA write issued from the source node 200a, the destination node 200b reserves a memory area for RDMA write in the main memory 220*b* of this node (S14). Once the data is received at the destination node 200*b*, the NIC 20*b* of this node sends an interrupt signal to software operating in a kernel mode so as to notify the kernel of the presence of the received data.

After reserving a memory area for RDMA write, the destination node 200*b* transmits a ready message to the source node 200*a* (S16).

Once receiving the ready message from the destination node 200*b*, the source node 200*a* executes a RDMA write (S18). It is noted that the source node 200*a* can detect the received message by an interrupt generated by the NIC 30 of this node.

After completing the RDMA write, the source node 200*a* transmits a completion message to the destination node 200*b* (S20). The sequence of the RDMA write process is thus completed.

Figure 6:
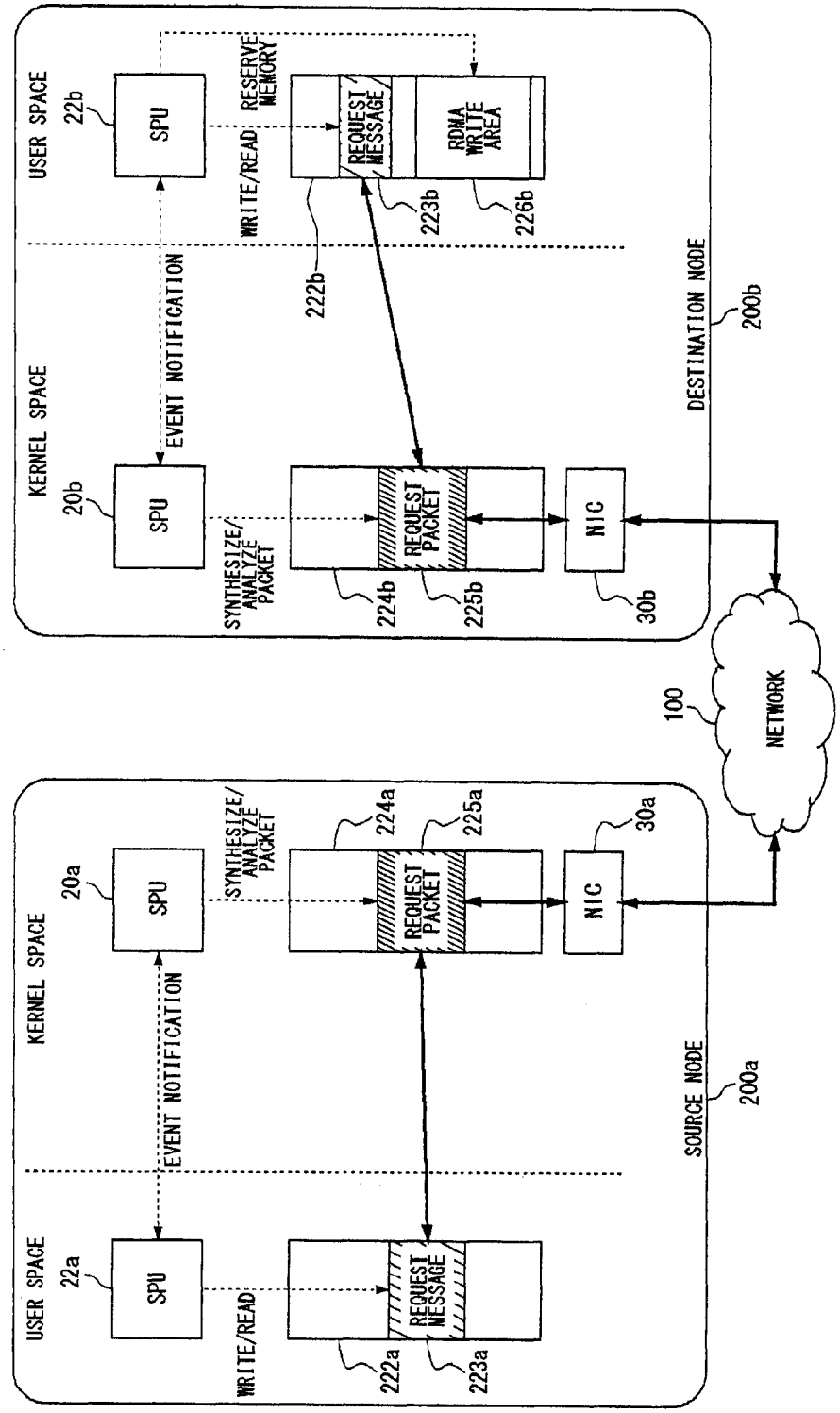
FIG. 6 illustrates send/receive operations by TCP that do not employ any RDMA functions in the sequence of the RDMA write process of FIG. 5.
Figure 7A:
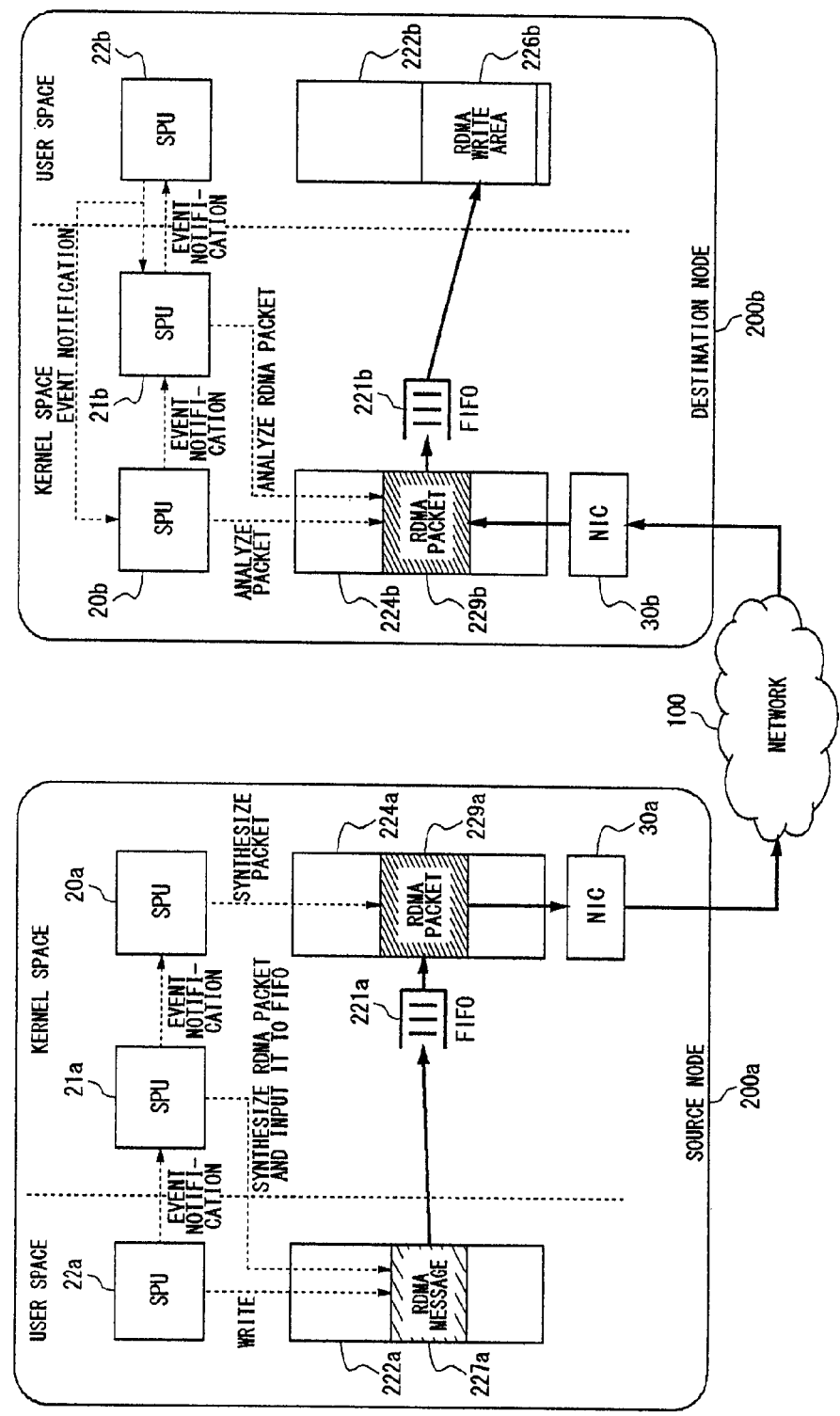
FIG. 7A illustrates send/receive operations by SDP that employ the RDMA functions in the sequence of the RDMA write process of FIG. 5.

With reference to FIG. 6 and FIG. 7A, it will be now explained in detail how each step in the sequence of the RDMA write process is performed by the use of the structure shown in FIG. 4. FIG. 6 illustrates send/receive operations by TCP that do not employ any RDMA functions in the sequence of the RDMA write process of FIG. 5. On the other hand, FIG. 7A illustrates send/receive operations by SDP that employ the RDMA functions in the sequence of the RDMA write process of FIG. 5.

Hereinafter, the case is explained in which the TCP/IP protocol stack is implemented in the SPU 20, however, the operations are basically the same for the case in which the TCP/IP protocol stack is implemented in the PU 10.

(1) Operation at Step S10

With reference to FIG. 4, the application program 11*u*-1 or 22*u*-1 that resides in a user space of the source node 200*a* issues a request for RDMA write. Here, the application program 11*u*-1, 22*u*-1 is executed on the PU 11, SPU 22 of the source node 200*a*, respectively. The PU 11, SPU 22 that executes the application program 11*u*-1, 22*u*-1 respectively is herein different from PU 10, SPU 20, 21 that executes the protocol stack, however, the same PU or SPU may execute both the application program and the protocol stack.

The socket switch 50 of the source node 200*a* discriminates that the request for RDMA write is one to be transmitted by a normal TCP/IP. This discrimination is achieved by executing the following command in the socket API 11*u*-2 or 22*u*-2 of the source node 200*a*.

socket(AF_INET,SOCK_STREAM,0);

Here, the first argument AF_INET of the socket command indicates that it conforms to the IPv4 internet protocol. The second argument SOCK_STREAM indicates that the communication is connection-oriented. The third argument "0" indicates that it uses a normal TCP/IP protocol.

The request message of RDMA write is passed through the TCP/IP protocol stack 20*s* implemented on the SPU 20 of the source node 200*a* and thereby synthesized into a request packet of RDMA write.

With reference to FIG. 6, the process for generating a request packet of RDMA write is explained. In the source node 200*a*, the SPU 22*a* operating at a user level generates a request message 223*a* of RDMA write in the application buffer 222*a* that resides in a user space. Then, the SPU 22*a* operating at a user level provides an event notification to the SPU 20*a* operating at a kernel level to notify the SPU 20*a* that the packet starts to be synthesized. This event notification may be achieved by a synchronization function such as an atomic instruction or may be achieved by providing in the SPU a register or a mail box dedicated for the event notification.

The SPU 20*a* at a kernel level reads the request message 223 of RDMA write from the application buffer 222*a* and adds a header to the request message 223*a* so as to generate a request packet 225*a* of RDMA write in a TCP/IP send/receive buffer 224*a* in a kernel space. The request packet 224*a* thus generated is sent out from the NIC 30*a* of the source node 200*a*.

(2) Operation at Step S12

After the issuance of the RDMA write request in the source node 200*a*, the SPU 22*a* in a user mode of the source node 200*a* executes an application and writes a RDMA message 227*a* to be RDMA written in the application buffer 222*a* so as to prepare data for RDMA write, as shown in FIG. 7A.

(3) Operation at Step S14

On the other hand, the destination node 200*b* receives the RDMA write request issued from the source node 200*a* at Step S10 and then prepares a memory area for RDMA write. As shown in FIG. 6, the NIC 30*b* of the source node 200*b* receives the RDMA write request packet 220*b* from the network 100 and copies it in a TCP/IP send/receive buffer 224*b*.

The SPU 20*b* in a kernel mode of the destination node 200*b* analyzes the RDMA write request packet 225*b* received in the TCP/IP send/receive buffer 224*b*, reassembles the request message 223*b* included in the packet and copies it in the application buffer 222*b* that resides in a user space. Then, the SPU 20*b* in a kernel mode provides an event notification to the SPU 22*b* operating in a user mode so as to notify of the receipt of the RDMA write request message.

Upon receiving the event notification from the SPU 20*b* in a kernel mode, the SPU 22*b* in a user mode executes the application 22*u*-1 and reads the RDMA write request message 223*b* and then reserves a memory area necessary for RDMA write (referred to as a "RDMA write area") in the application buffer 222*b*.

(4) Operation at Step S16

Then, the application 22*u*-1 in a user space of the destination node 200*b* sends a ready message back to the source node 200*a*. As in the case of the RDMA write request message, the socket switch 50 of the destination node 200*b* executes a command in which a TCP/IP protocol is designated so that the ready message is processed by the TCP/IP protocol stack 20*s* according to the normal TCP/IP protocol and finally sent out from the NIC 30*b*.

(5) Operation at Step S18

With reference to FIG. 4 and FIG. 7A, the operation of RDMA write will be explained in detail. The application program 11*u*-1 or 22*u*-1 on the source node 200*a* issues a RDMA write command. At that time, the socket API 11*u*-2 or 22*u*-2 uses a following command.

socket(AF_INET_SDP,SOCK_STREAM,0);

Here, the first argument AF_INET_SDP indicates that SDP is used as a communication protocol so as to perform the RDMA functions. The other parameters are the same as described earlier.

By referring to the first argument of the socket command, the socket switch 50 recognizes that a RDMA operation is required and then provides an event notification to the SPU 21*a* in which the RDMA protocol stack is implemented to enable the SPU 21*a* to generate a RDMA packet.

With reference to FIG. 7A, the process for generating a RDMA packet is explained. In the source node 200*a*, upon receiving the event notification from the SPU 22*a* in a user mode, the SPU 21*a* in a kernel mode segments the RDMA message 227*a* stored in the application buffer 222*a* in a user space and synthesizes a RDMA packet, and then queues the RDMA packet in the FIFO buffer 221*a*.

The FIFO buffer 221a is shared by the SPU 21a in which a RDMA protocol stack is implemented and the SPU 20a in which a TCP/IP protocol stack is implemented. The SPU 21a provides an event notification to the SPU 20a to notify that the RDMA packet to be transmitted has been queued in the FIFO buffer 221a. The SPU 20a thus event-notified places the RDMA packet stored in the FIFO buffer 221a into a TCP/IP packet and then copies the packet into the TCP/IP send/receive buffer 224a. The NIC 30a sends out the RDMA packet 229a stored in the TCP/IP send/receive buffer 224a to the network 100.

On the other hand, the socket API 11u-2 or 22u-2 in the destination node 200b issues the socket command to declare the use of the RDMA functions. Then, the SPU 21b and SPU 20b in a kernel level is notified of the presence of an RDMA event by the SPU 22b in a user level, by means of the socket switch 50.

The NIC 30b of the destination node 200b receives the RDMA packet 229b from the network 100 and copies it into the TCP/IP send/receive buffer 224b. The SPU 20b in which the TCP/IP protocol stack 20s is implemented analyzes the RDMA packet 229b stored in the TCP/IP send/receive buffer 224b according to the TCP/IP protocol and then queues the TCP/IP packet in the FIFO buffer 221b. The FIFO buffer 221b is shared by the SPU 20b in which the TCP/IP protocol stack 20s is implemented and the SPU 21b in which the RDMA protocol stack 21r is implemented. After performing the TCP/IP protocol processing, the SPU 20b provides an event notification to the SPU 21b that performs the RDMA protocol processing to notify of the reception of the RDMA packet.

The SPU 21b in which the RDMA protocol stack 21r is implemented analyzes the RDMA packet stored in the FIFO buffer 221b according to the RDMA protocol and reassemble the message to be RDMA written and then writes it into the RDMA write area 226b in the application buffer 222b.

(6) Operation at Step S20

After completing the issuance of the RDMA write, the source node 200a transmits a "completion" message to the destination node 200b. This completion message is transmitted as a normal TCP/IP packet that does not rely on any RDMA functions, as described in FIG. 6. The destination node 200b receives the completion message and releases the RDMA write area 226b and thus finishes the RDMA write operation.

As described so far, according to the first embodiment example, the RDMA protocol process is software emulated so that even a non-RDMA-enabled NIC can perform the communication using the RDMA functions. In the first embodiment example, a plurality of processors in the node 200 each perform an individual specific processing such as a TCP/IP protocol processing or a RDMA protocol processing. If the same processor performs both the TCP/IP protocol processing and the RDMA protocol processing, a context switch will occur in switching between these protocol processings, resulting in producing some overhead. In the first embodiment example, a multiprocessor system is employed so that one processor that performs the TCP/IP protocol processing and another processor that performs the RDMA protocol processing are separately provided. Thereby, the overhead caused by the context switch can be eliminated and a high speed network processing can be achieved. Furthermore, communication can be done by solely using the processor in which the TCP/IP protocol stack is implemented if the communication does not employ any RDMA functions.

Figure 7B:
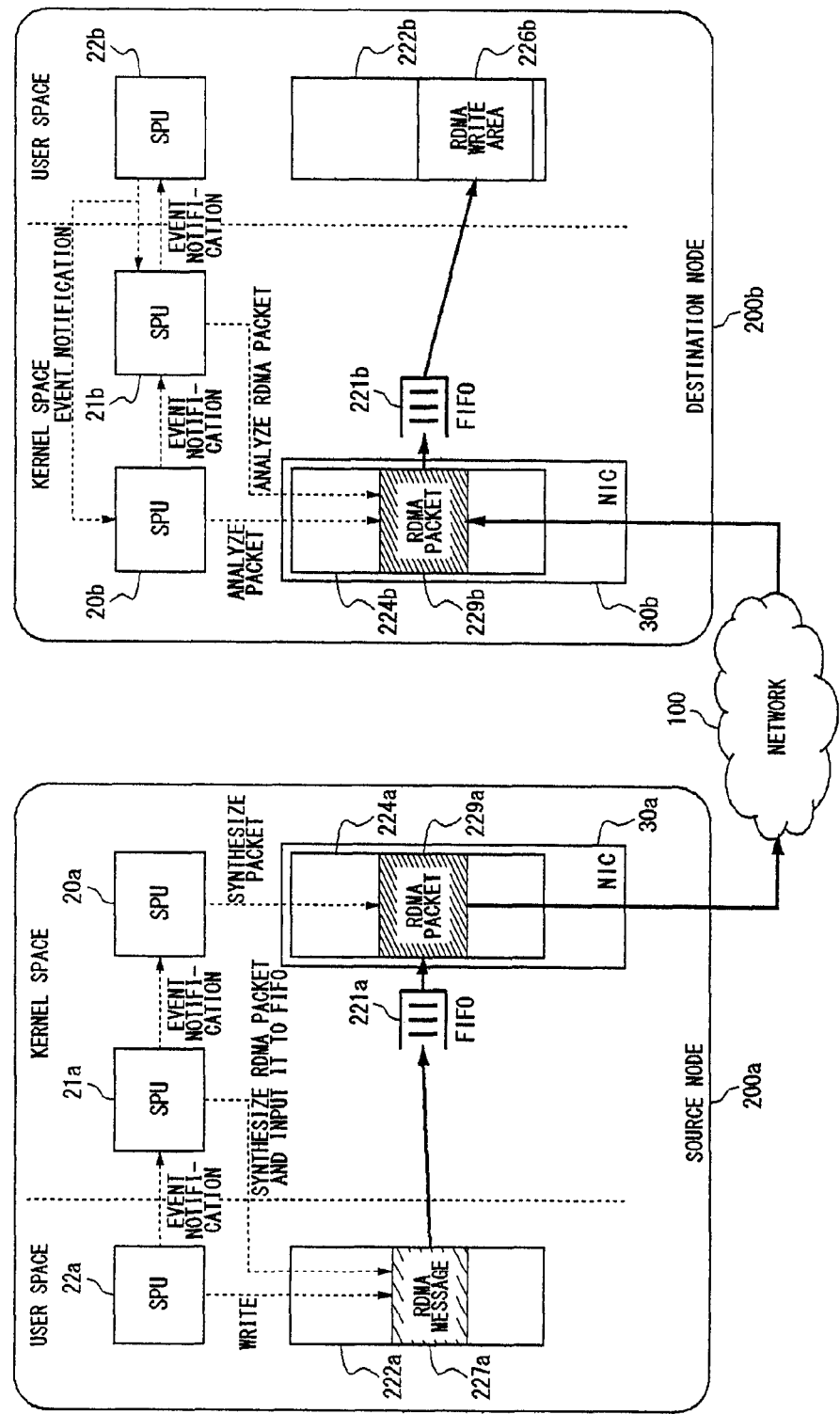
FIG. 7B illustrates a structure in which a TCP/IP send/receive buffer is provided in a NIC installed in each node.

In the above embodiment, the configuration has been explained in which the TCP/IP send/receive buffer 224 is provided in the main memory 220 in each node 200, however, the TCP/IP send/receive buffer 224 may be provided in the NIC 30 installed in each node 200 as shown in FIG. 7B. In this case, it is not necessary to copy the RDMA packet 229 between the main memory 220 and the buffer in the NIC 30 so that so-called "zero-copy" can be achieved resulting in eliminating some overhead caused by memory-to-memory copy.

Second Embodiment Example

FIG. 8 is a block diagram of the node 200 according to the second embodiment example. In the first embodiment example, the case has been explained in which the node 200 is equipped with the normal NIC 30 with no TOE function. In the second embodiment example, the case will be explained in which the node 200 is equipped with the TOE-NIC 21 having a TOE function. Since the configuration on startup of the system enables the TOE-NIC 21 to operate, any structure related to the NIC 30 that does not operate is not shown in the figure. Since a TCP/IP protocol stack is implemented in the TOE-NIC 31, the TCP/IP protocol processing can be performed inside the TOE-NIC 31.

Figure 9:
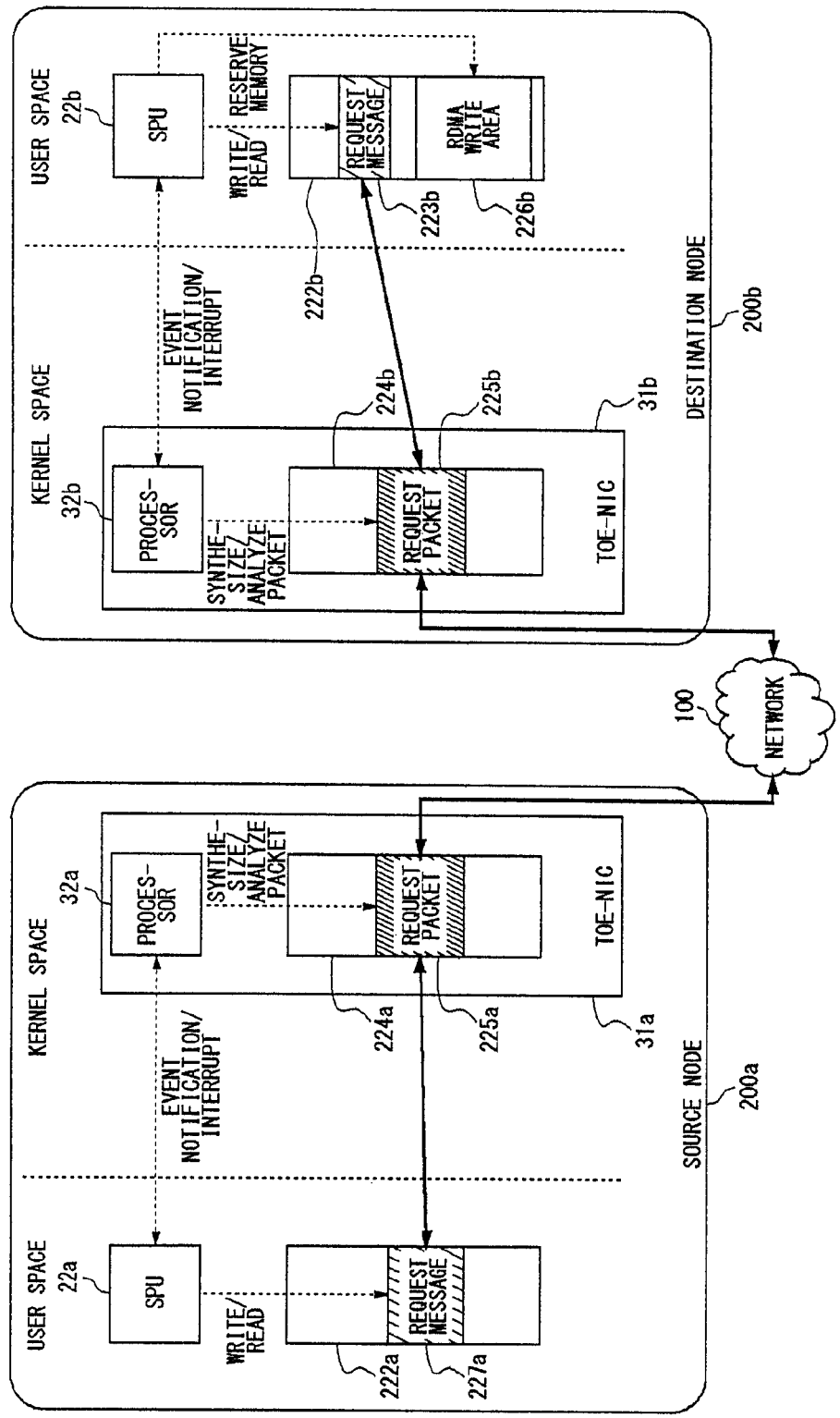
FIG. 9 shows send/receive operations by TCP that do not employ any RDMA functions in the sequence of the RDMA write process of FIG. 5.
Figure 10:
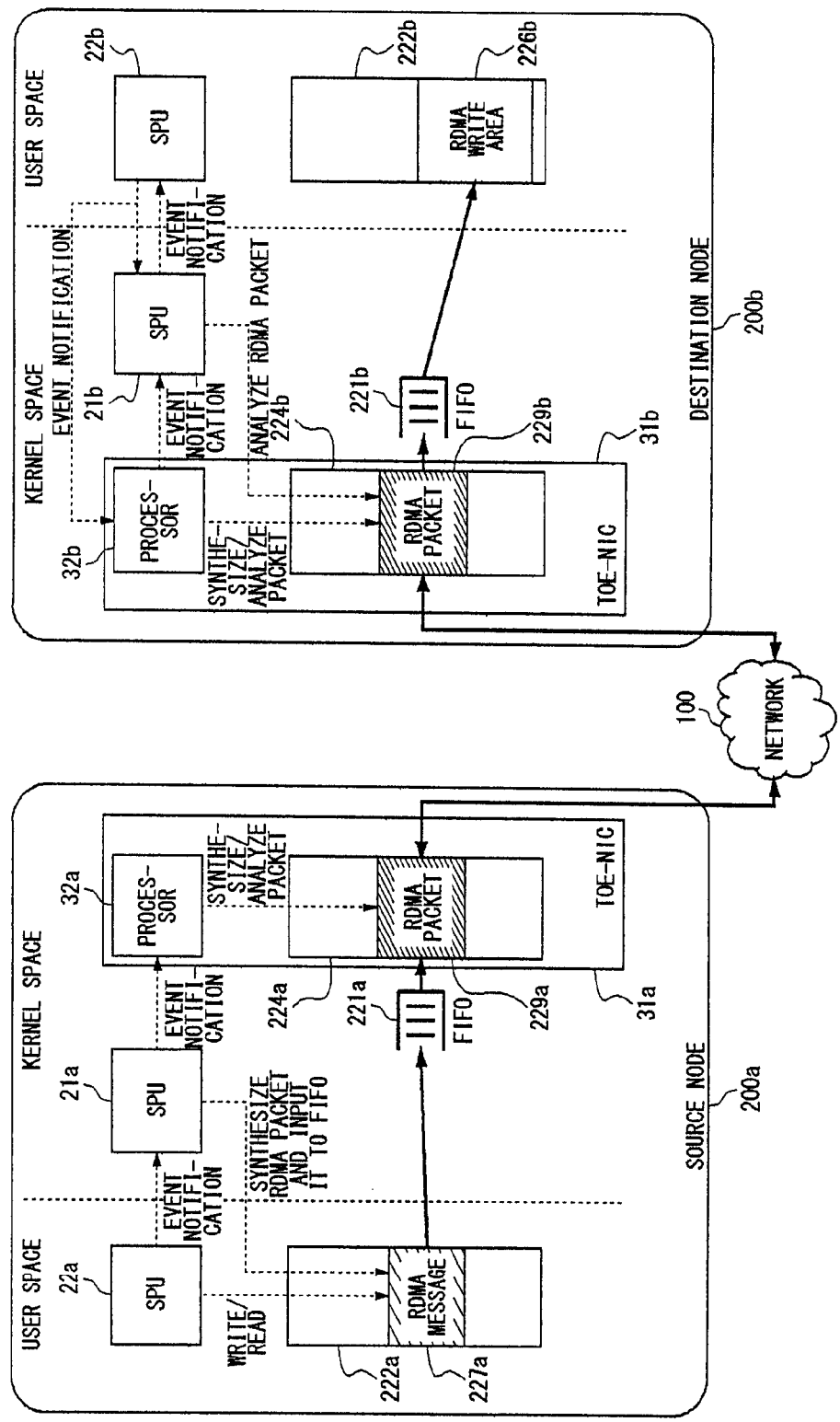
FIG. 10 shows send/receive operations by SDP that employs the RDMA functions in the sequence of the RDMA write process of FIG. 5.

In the second embodiment example, the operation will be described for the case in which a RDMA write is executed between the source node 200a and the destination node 200b as in the first embodiment example. The sequence of the RDMA write process between the source node 200a and the destination node 200b is the same as in FIG. 5 of the first embodiment example. With reference to FIG. 9 and FIG. 10, it will be now explained in detail how each step in the sequence of the RDMA write process is executed by the structure of FIG. 8. FIG. 9 shows send/receive operations by TCP that do not employ any RDMA functions in the sequence of the RDMA write process of FIG. 5. On the other hand, FIG. 10 shows send/receive operations by SDP that employ the RDMA functions in the sequence of the RDMA write process of FIG. 5. Hereinafter, the explanation of the operations similar to the first embodiment example will be simplified as appropriate.

(1) Operation at Step S10

With reference to FIG. 8, the application program 11u-1 or 22u-1 that resides in a user space of the source node 200a issues a request for RDMA write. As described in the first embodiment example, the socket switch 50 of the source node 200a discriminates that the request for RDMA write is one to be transmitted by a normal TCP/IP. In the second embodiment example, normal communication that does not rely on the RDMA operations is also performed on the SPU 21a in which the RDMA protocol stack is implemented.

The socket layer 21r-1 of the source node 200a discriminates that it is normal TCP/IP communication that does not necessitate the RDMA protocol processing by referring to the argument of the command issued by the socket switch 50. Then the socket layer 21r-1 bypasses the RDMA protocol stack composed of the SDP layer 21r-2, RDMA layer 21r-3, DDP layer 21r-4 and MPA layer 21r-5, and directly passes a request message for RDMA write to the device driver 21r-6.

With reference to FIG. 9, the SPU 22a operating in a user mode provides an event notification to the processor 32a in the TOE-NIC 31a. The processor 32a reads the request message 223a for RDMA write stored in the application buffer 222a in a user space and synthesizes it as a TCP/IP packet and then writes the request packet 225a for RDMA write in the TCP/IP send/receive buffer 224a that is provided inside the TOE-NIC 31a. The TOE-NIC 31a transmits the request packet 225a stored in the TCP/IP send/receive buffer 224a to the network 100.

(2) Operation at Step S12

After the issuance of the RDMA write request in the source node 200a, the SPU 22a in a user mode of the source node 200a executes an application and writes a RDMA message 227a to be RDMA written in the application buffer 222a, as shown in FIG. 10.

(3) Operation at Step S14

On the other hand, the destination node 200b receives the RDMA write request issued from the source node 200a at Step S10 and then prepares a memory area for RDMA write. As shown in FIG. 9, the TOE-NIC 31b of the source node 200b receives the RDMA write request packet 225b from the network 100 and copies it in the TCP/IP send/receive buffer 224b that is provided inside the TOE-NIC 31b.

The processor 32b inside the TOE-NIC 31b analyzes the RDMA write request packet 225b received in the TCP/IP send/receive buffer 224b, reassembles the request message 223b included in the packet and copies it in the application buffer 222b in a user space. Then, the processor 32b provides an event notification to the SPU 22b in a user mode so as to notify of the receipt of the RDMA write request message.

Upon receiving the event notification from the processor 32b, the SPU 22b executes the application 22u-1 and reads the RDMA write request message 223b and then reserves a memory area necessary for RDMA write (a RDMA write area) in the application buffer 222b.

(4) Operation at Step S16

Then, the application 22u-1 in a user space of the destination node 200b sends a ready message back to the source node 200a. As in the case of the RDMA write request message, the socket switch 50 of the destination node 200b executes a command in which a TCP/IP protocol is designated so that the ready message is passed to the device driver 21r-6 bypassing the RDMA protocol stack in the SPU 21. The message is subject to the TCP/IP protocol processing by the TOE function of the TOE-NIC 31b and sent out to the network 100.

(5) Operation at Step S18

With reference to FIG. 8 and FIG. 10, the operation of RDMA write will be explained in detail. The application program 11u-1 or 22u-1 on the source node 200a issues a RDMA write command.

By referring to the argument of the socket command, the socket switch 50 recognizes that a RDMA operation is required and then provides an event notification to the SPU 21a in which the RDMA protocol stack is implemented to enable the SPU 21a to generate a RDMA packet.

With reference to FIG. 10, the process for generating a RDMA packet is explained. In the source node 200a, upon receiving the event notification from the SPU 22a in a user mode, the SPU 21a in a kernel mode segments the RDMA message 227a stored in the application buffer 222a in a user space and synthesizes a RDMA packet, and then queues the RDMA packet in the FIFO buffer 221a.

The FIFO buffer 221a is shared by the SPU 21a in which a RDMA protocol stack is implemented and the processor 32a in which a TCP/IP protocol stack is implemented. The SPU 21a provides an event notification to the processor 32a inside the TOE-NIC 31a to notify that the RDMA packet to be transmitted has been queued in the FIFO buffer 221a. The processor 32a thus event-notified places the RDMA packet stored in the FIFO buffer 221a into a TCP/IP packet and then copies the packet into the TCP/IP send/receive buffer 224a that is provided inside the TOE-NIC 31a. The TOE-NIC 31a sends out the RDMA packet 229a stored in the TCP/IP send/receive buffer 224a to the network 100.

On the other hand, the socket API 11u-2 or 22u-2 in the destination node 200b declares the use of the RDMA functions. The SPU 21b and the processor 32b inside the TOE-NIC 31b are notified of the presence of an RDMA event by the SPU 22b in a user level, by means of the socket switch 50.

The TOE-NIC 31b of the destination node 200b receives the RDMA packet 229b from the network 100 and stores it in the TCP/IP send/receive buffer 224b. The processor 32b inside the TOE-NIC 31b analyzes the RDMA packet 229b stored in the TCP/IP send/receive buffer 224b according to the TCP/IP protocol and then queues the TCP/IP packet in the FIFO buffer 221b. The FIFO buffer 221b is shared by the processor 32b inside the TOE-NIC 31b and the SPU 21b in which the RDMA protocol stack 21r is implemented. After performing the TCP/IP protocol processing, the processor 32b provides an event notification to the SPU 21b that performs the RDMA protocol processing to notify of the reception of the RDMA packet.

The SPU 21b in which the RDMA protocol stack 21r is implemented analyzes the RDMA packet stored in the FIFO buffer 221b according to the RDMA protocol and reassembles the message to be RDMA written and then writes it into the RDMA write area 226b in the application buffer 222b.

It is noted that the FIFO buffer 221a, 221b is not necessarily provided in the main memory in each node 200a, 200b and it may be provided inside the TOE-NIC 31a, 31b.

(6) Operation at Step S20

After completing the issuance of the RDMA write, the source node 200a transmits a "completion" message to the destination node 200b. This completion message is transmitted as a normal TCP/IP packet that does not rely on any RDMA functions, as described in FIG. 9. The destination node 200b receives the completion message and releases the RDMA write area 226b and thus completes the RDMA write operation.

As described so far, according to the second embodiment example, the RDMA protocol process is software emulated so that even a non-RDMA-enabled NIC can perform the communication using the RDMA functions. In the second embodiment example, a multiprocessor system is provided in which one processor performs the RDMA protocol processing, while another processor executes an application at a user level so that the RDMA protocol processing can be executed effectively. Furthermore, one processor equipped with the NIC having a TOE function can performs the TCP/IP protocol processing on the RDMA protocol-processed packet without putting a load on another processor in charge of the RDMA protocol processing.

Third Embodiment Example

The RDMA operation using the normal NIC 30 with no TOE function is described in the first embodiment example, while the RDMA operation using the TOE-NIC 31 having a TOE function is described in the second embodiment example. In reality, there may exist a network node in which a plurality of NICs are installed: one is a NIC with no TOE function and another is a NIC with a TOE function. A router is an example of such a network node. Since a different type of NIC is installed for each port of a router, a plurality of different types of NICs may coexist in one router. As another example, a configuration may be provided such that a different IP address is assigned to each processor in a multiprocessor system and a different NIC is provided for each processor. Hereinafter, as the third embodiment example, the configuration of a network node in which a NIC with no TOE function and a NIC with a TOE function coexist is considered. A communication mechanism for dynamically switching between the TOE-less NIC and the TOE-NIC is now explained.

Figure 11:
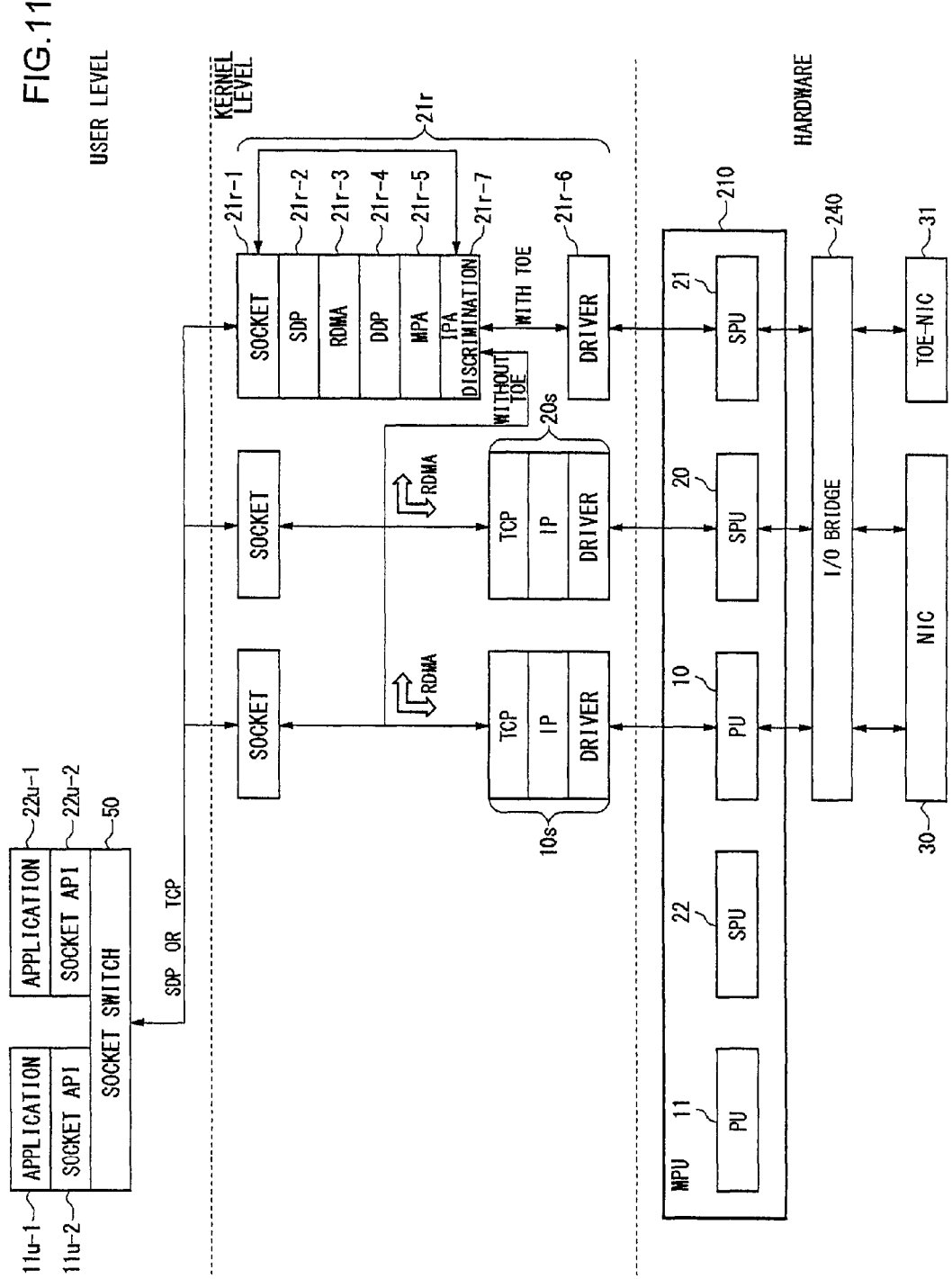
FIG. 11 is a block diagram of the node according to the third embodiment example.

FIG. 11 is a block diagram of the node 200 according to the third embodiment example. The NIC 30 with no TOE function and the TOE-NIC 31 with a TOE function are installed in the node 200 and are connected to each processor of the MPU 210 via the I/O bridge 240. The PU 10 and the SPU 20 in which the TCP/IP protocol stacks 10s and 20s are implemented respectively communicate by using the TOE-less NIC 30, while the SPU 21 in which the RDMA protocol stack 21r is implemented communicates by using the TOE-NIC 31 with a TOE function.

Under the MPA layer 21r-5 of the RDMA protocol stack 21r, an internet protocol address (IPA) discrimination layer 21r-7 is newly provided to discriminate the IP address of a packet. An address table that associates a source IP address with a MAC address of the NIC is provided in advance in the IPA discrimination layer 21r-7. Here, the MAC address is a unique address assigned to each NIC. In transmitting a message, the IPA discrimination layer 21r-7 obtains the source address of an IP packet and refers to the address table so as to determine which NIC the packet should be transmitted from.

In the IPA discrimination layer 21r-7, if it is determined that the source IP address of the packet is associated with a MAC address of TOE-less NIC 30, the SPU 21 in which the RDMA protocol stack 21r is implemented provides an event notification to the SPU 20 in which the TCP/IP protocol stack 20s is implemented. Thereby, the packet is subject to the protocol processing by the TCP/IP protocol stack 20s of the SPU 20 and transmitted from the NIC 30.

In the IPA discrimination layer 21r-7, if it is determined that the source IP address of the packet is associated with a MAC address of TOE-NIC 31 with a TOE function, the SPU 21 in which the RDMA protocol stack 21r is implemented provides an event notification to itself or passes the packet to the driver 21r-6. Thereby, the packet is provided to the TOE-NIC 21 and subject to the TCP/IP protocol processing by using the TOE function of the TOE-NIC 31.

In receiving a packet from the network, it has been already designated whether a normal TCP/IP communication or a communication using the RDMA functions is designated at the time of initiating the communication. Therefore it is not necessary to provide any specialized function in the protocol stacks 10s, 20s.

According to the third embodiment example, even in a system in which both a TOE-less NIC and a TOE-NIC coexist, communication can be performed by dynamically switching between either of the NICs so that the system can have flexibility and extensibility.

Second Embodiment

In the second embodiment, a server-client system employing the RDMA functions will be explained, as an application example of the node 200 described in the first embodiment.

Figure 12:
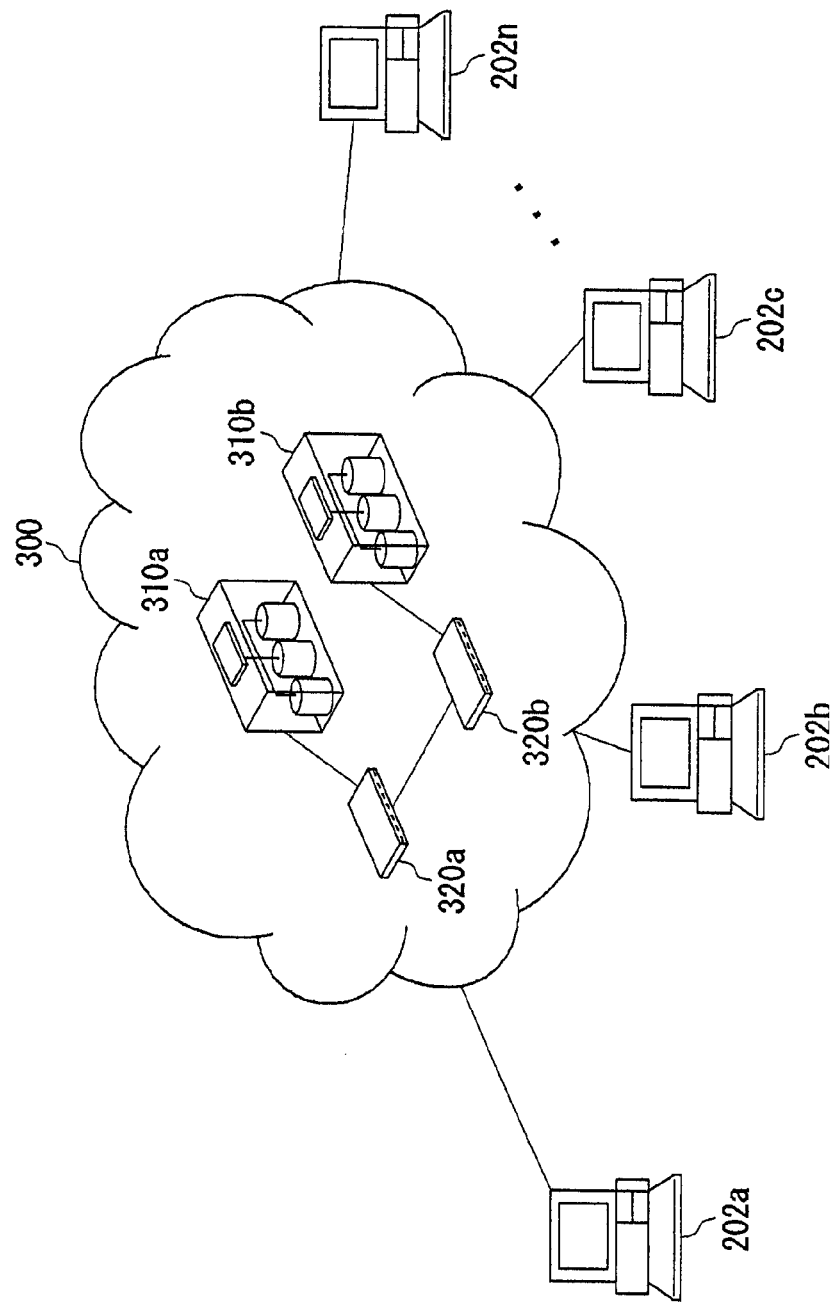
FIG. 12 is a block diagram of a network system according to the second embodiment.

FIG. 12 is a block diagram of a network system according to the second embodiment. The network system is composed of a plurality of servers 310a, 310b and a plurality of clients 202a-202n connected via a network. The plurality of the servers 310a, 310b connected to the network via switches 320a, 320b are formed as a server cluster 300 that functions as a single server when it is observed from the clients 202a-202n. Hereinafter, the plurality of the servers 310a, 310b are collectively or individually referred to as a server 310 and the plurality of the clients 202a-202n as a client 202.

The server 310 is equipped with a RDMA-enabled NIC that can reduce the load on the CPU of the server 310. On the other hand, the client 202 has software emulated RDMA functions so that so called iWARP can be realized. With this, the communication with the server 310 can be possible by using RDMA and it contributes to the reduction of the load on the server 310.

Figure 13:
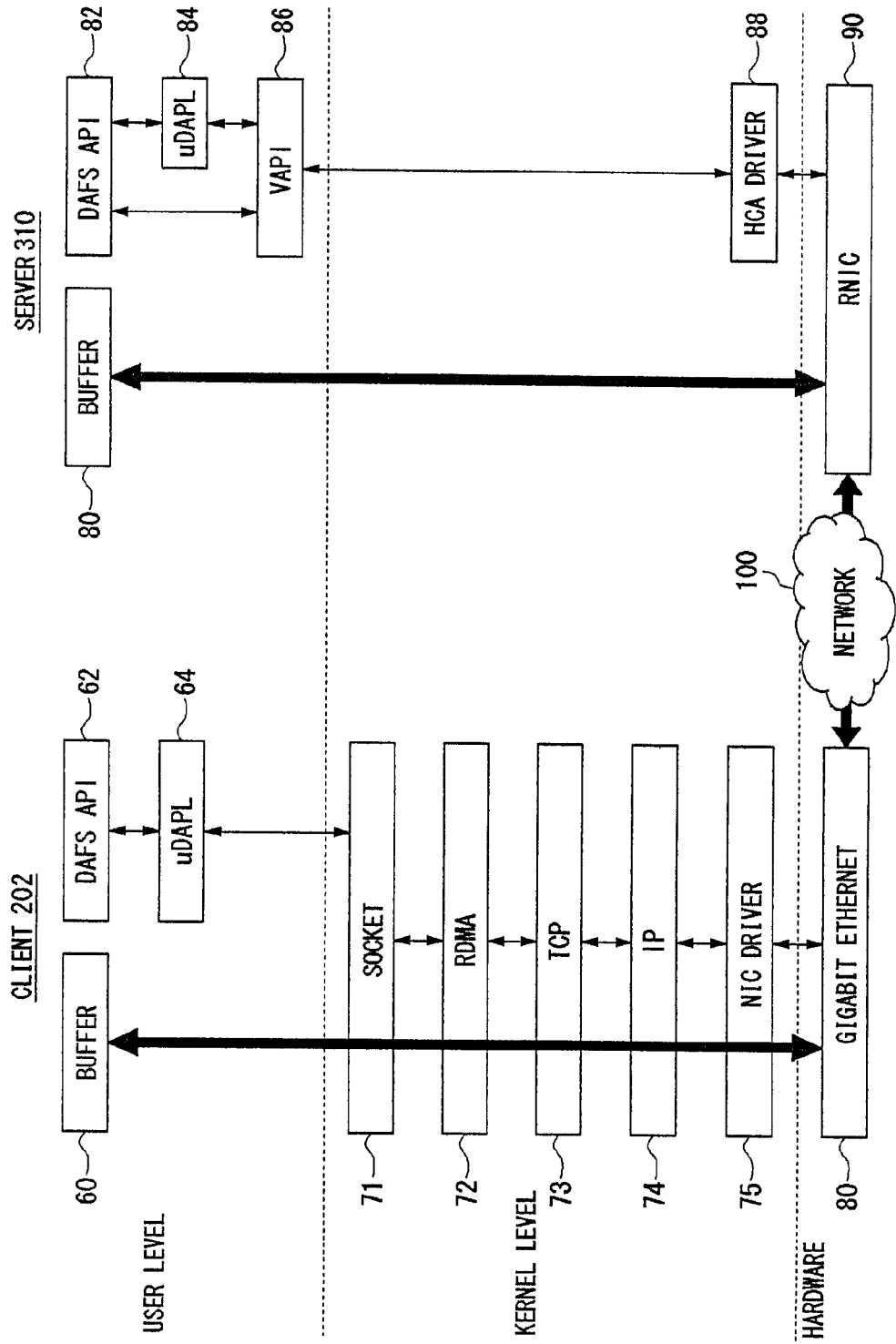
FIG. 13 is a block diagram of the client and the server of FIG. 12.

FIG. 13 is a block diagram of the client 202 and the server 310. The client 202 may be like a multiprocessor system described in the first embodiment in which the RDMA protocol stack is implemented in one processor, while the TCP/IP protocol stack is implemented in another processor. Nevertheless, in the second embodiment, the case is explained in which the client 202 is a single processor system in which both the RDMA protocol stack and the TCP/IP protocol stack are executed.

The client 202 is provided with a buffer 60 at a user level that stores data to be transmitted to the server 310 and data received from the server 310. A direct access file system (DAFS) API 62 is an application program interface (API) of DAFS that is a filesystem running over the RDMA protocol. A user direct access programming library (uDAPL) 64 is a general-purpose API for realizing the RDMA functions. The client 202 accesses to the data in the server 310 by using the RDMA functions through these APIs.

At a kernel level, a socket layer 71, a RDMA layer 72, a TCP layer 73, an IP layer 74, and a NIC driver 75 are implemented. A RDMA read packet and a RDMA write packet are subject to the protocol processing through these layers and are transmitted to the network 100 via a Gigabit Ethernet 80.

The server 310 is provided with a buffer 80 at a user level that stores data to be transmitted to the client 202 and data received from the client 202. As in the client 202, the DAFS API 82 and uDAPL 84 are implemented in the server 310. Furthermore, a VAPI 86 that is a virtual API for accessing to a HCA driver 88 at a kernel level is implemented.

A RDMA-enabled NIC (hereinafter referred to as "RNIC") 90 is installed in the server 310 and it is controlled by the HCA driver 88 at a kernel level. The RDMA protocol processing is executed by hardware in the RNIC 90 so that data can be directly read/written from/to the buffer 80 without using the CPU of the server 310. It is noted that the RNIC 90 is also provided with a TOE function and therefore the TCP/IP protocol processing can be also performed by hardware.

In FIG. 13, when a RDMA read or a RDMA write is issued from the client 202 to the server 310, the RDMA functions are executed by software in the RDMA layer 72 of the client 202, while the RDMA functions are executed by hardware in the RNIC 90 of the server 310. Thereby, the client 202 can directly access to the buffer 80 of the server 310 without putting any loads on the CPU of the server 310.

According to the server-client system of the second embodiment, if the server is provided with the RDMA functions but the client is not equipped with a RNIC, the client can emulates the RDMA functions and therefore the communication that necessitates the RDMA functions can be done between the server and the client. The RDMA functions implemented in the server are thus utilized effectively and a high speed communication can be achieved. In such a circumstance that a RNIC cannot be installed in a certain client or the installation of the RNIC is delayed for some reasons, it is not necessary that the RDMA functions of the server is aborted. Therefore, any client can be added to the system regardless of whether or not the client is equipped with a RNIC and the enhancement of the server-client system is easily achieved.

As described so far, since the RDMA protocol and the TCP protocol are resident on the multiprocessor system in these embodiments, the RDMA function can be emulated at a low cost without purchasing a new RDMA-enabled NIC. In the embodiments, the RDMA protocol stack is implemented at a kernel level, however, it may be implemented at a user level. The technology for implementing the RDMA functions over TCP/IP is called iWARP. With this, data can be directly written to the memory of the destination node over a network resulting in reduction in processing latency. If iWARP is implemented by software, even a system with no RDMA hardware can achieve the RDMA functionality.

The description of the invention given above is based upon some embodiments. The embodiments described are only illustrative in nature and various variations in constituting elements and processes involved are possible. Those skilled in the art would readily appreciate that such variations are also within the scope of the present invention. Some such variations will now be described.

In the embodiments, an event notification from one processor to another processor is used to notify another processor of the presence of data to be sent or received data. Alternatively, an event may be detected by PU or SPU polling the receive buffer.

The buffer for storing packets are configured by using the main memory 220 in each node 200, however, if each processor in the MPU 210 has an individual local memory, the buffer for storing packets may be configured by using such a local memory.

It is noted that a socket program issues a "send" or "recv" command when sending or receiving a packet, however, the detailed process of the socket has been omitted for ease of explanation in the embodiments.

What is claimed is:

1. A network processor system comprising:
a first processor, which is operable to implement a remote direct memory access stack on a kernel level, within a multiprocessing unit, and being operable to generate a message to be transmitted in a user space;
a buffer to which the first processor offloads a generated remote direct memory access packet;
a second processor within the multiprocessing unit operable to perform Transmission Control Protocol/Internet Protocol (TCP/IP) processing on a kernel level that reads the generated remote direct memory access packet from the buffer so as to perform TCP/IP processing thereon and that generates a TCP/IP packet to be transmitted; and
a network interface card, which transmits to a network a TCP/IP packet that is generated by the second processor, wherein:
the network interface card having the TCP/IP offload function synthesizes the message into a TCP/IP packet according to a TCP/IP protocol upon receiving a notification from the first processor so as to transmit the message to be transmitted without using the remote direct memory access function,
the first processor has a protocol switching function for discriminating difference in a designated protocol so as to switch destination to which an event is notified, and
the protocol switching function provides an event notification to the second processor so as to synthesize the message into a packet according to a remote direct memory access protocol if a remote direct memory access protocol is designated, while providing an event notification to the network interface card having the TCP/IP offload function so as to synthesize the message into a TCP/IP packet according to a TCP/IP protocol if a remote direct memory access protocol is not designated.

2. A network processor system comprising:
a first processor within a multiprocessing unit adapted to perform a process on a user level, the first processor being operable to generate a message to be transmitted in a user space;
a buffer to which the first processor writes the message to be transmitted;
a second processor within the multiprocessing unit operable to implement a remote direct memory access stack on a kernel level, the second processor being operable to read from the buffer the message from the first processor, to synthesize the message into a remote direct memory access packet according to a remote direct memory access protocol upon receiving a notification from the first processor, and to place the remote direct memory access packet in a queue;
a third processor within the multiprocessing unit operable to perform Transmission Control Protocol/Internet Protocol (TCP/IP) processing on a kernel level that reads the generated remote direct memory access packet that has been queued upon receiving a notification from the second processor so as to synthesize the remote direct memory access packet into a TCP/IP packet according to the TCP/IP protocol; and
a network interface card, which transmits to a network a TCP/IP packet thus generated by the third processor and given to the network interface card, wherein:
the third processor is operable to synthesize the message into a TCP/IP packet according to a TCP/IP protocol upon receiving a notification from the first processor so as to transmit the message to be transmitted without using the remote direct memory access function,
the first processor has a protocol switching function for discriminating difference in a designated protocol so as to switch destination to which an event is notified, and
the protocol switching function provides an event notification to the second processor so as to synthesize the message into a packet according to a remote direct memory access protocol if a remote direct memory access protocol is designated, while providing an event notification to the third processor so as to synthesize the message into a TCP/IP packet according to a TCP/IP protocol if a remote direct memory access protocol is not designated.

3. A network processor system comprising:
a first processor within a multiprocessing unit adapted to perform a process on a user level, the first processor being operable to generate a message to be transmitted in a user space;
a buffer to which the first processor writes the message to be transmitted;
a second processor within the multiprocessing unit operable to implement a remote direct memory access stack on a kernel level, the second processor being operable to read from the buffer the message from the first processor, to synthesize the message into a remote direct memory access packet according to a remote direct memory access protocol upon receiving a notification from the first processor, and to place the remote direct memory access packet in a queue; and
a network interface card, which has a Transmission Control Protocol/Internet Protocol (TCP/IP) offload function for reading the remote direct memory access packet from the buffer that has been queued to be transmitted upon receiving a notification from the second processor so as to perform a TCP/IP protocol processing thereon, wherein:

the network interface card having the TCP/IP offload function synthesizes the message into a TCP/IP packet according to a TCP/IP protocol upon receiving a notification from the first processor so as to transmit the message to be transmitted without using the remote direct memory access function, the first processor has a protocol switching function for discriminating difference in a designated protocol so as to switch destination to which an event is notified, and the protocol switching function provides an event notification to the second processor so as to synthesize the message into a packet according to a remote direct memory access protocol if a remote direct memory access protocol is designated, while providing an event notification to the network interface card having the TCP/IP offload function so as to synthesize the message into a TCP/IP packet according to a TCP/IP protocol if a remote direct memory access protocol is not designated.

4. A network processor system comprising:

a first processor within a multiprocessing unit operable to implement a remote direct memory access stack on a kernel level;

a buffer to which the first processor offloads a generated remote direct memory access packet;

a second processor within the multiprocessing unit operable to read the remote direct memory access packet from the buffer so as to perform Transmission Control Protocol/Internet Protocol (TCP/IP) protocol processing thereon and to generate a TCP/IP packet to be transmitted;

a first network interface card, which transmits a TCP/IP packet thus generated by the second processor to a network; and a second network interface card, which has a TCP/IP offload function for reading from the buffer a remote direct memory access packet so as to perform a TCP/IP protocol processing thereon, and wherein the first processor has a function for referring to a table, which associates a destination IP address of the packet with the MAC address of either of the first or the second network interface card so as to determine whether the first or second network interface card will be utilized for transmitting the remote direct memory access packet depending on the destination IP address, wherein the remote direct memory access packet is subject to TCP/IP protocol processing by the second processor and transmitted from the first network interface card if the remote direct memory access packet is directed to the first network interface card, and wherein the remote direct memory access packet is subject to TCP/IP protocol processing by the TCP/IP offload function of the second network interface card and transmitted from the second network interface card if the remote direct memory access packet is directed to the second network interface card.

5. A non-transitory computer-readable storage medium with a program product stored thereon, the program product comprising:

a computer-readable program code module for making a first processor within a multiprocessing unit execute generating a message to be transmitted in a user space and writing the message in a buffer, the first processor being adapted to perform a process on a user level;

a computer-readable program code module for making a second processor, which is within the multiprocessing unit and operable to implement a remote direct memory access stack on a kernel level, execute reading from the buffer the message from the first processor, synthesizing the message into a remote direct memory access packet according to a remote direct memory access protocol upon receiving a notification from the first processor, and placing the remote direct memory access packet in a queue; and a computer-readable program code module for making a third processor within the multiprocessing unit execute reading the remote direct memory access packet from the buffer that has been queued to be transmitted upon receiving a notification from the second processor so as to synthesize the remote direct memory access packet into a Transmission Control Protocol/Internet Protocol (TCP/IP) packet according to a TCP/IP protocol, the third processor being adapted to perform a TCP/IP protocol processing on a kernel level, wherein:

the third processor is operable to synthesize the message into a TCP/IP packet according to a TCP/IP protocol upon receiving a notification from the first processor so as to transmit the message to be transmitted without using the remote direct memory access function, the first processor has a protocol switching function for discriminating difference in a designated protocol so as to switch destination to which an event is notified, and the protocol switching function provides an event notification to the second processor so as to synthesize the message into a packet according to a remote direct memory access protocol if a remote direct memory access protocol is designated, while providing an event notification to the third processor so as to synthesize the message into a TCP/IP packet according to a TCP/IP protocol if a remote direct memory access protocol is not designated.

6. A non-transitory computer-readable storage medium with a program product stored thereon, the program product comprising:

a computer-readable program code module for making a first processor within a multiprocessing unit execute generating a message to be transmitted in a user space and writing the message in a buffer, the first processor being adapted to perform a process on a user level;

a computer-readable program code module for making a second processor, which is within the multiprocessing unit and operable to implement a remote direct memory access stack on a kernel level, execute reading from the buffer the message from the first processor, synthesizing the message into a remote direct memory access packet according to a remote direct memory access protocol upon receiving a notification from the first processor, and placing the remote direct memory access packet in a queue; and a computer-readable program code module for making a third processor execute reading the remote direct memory access packet from the buffer that has been queued to be transmitted upon receiving a notification from the second processor so as to perform Transmission Control Protocol/Internet Protocol (TCP/IP) protocol processing thereon, the third processor being adapted to perform a TCP/IP offload function inside a network interface card wherein:

the third processor is operable to synthesize the message into a TCP/IP packet according to a TCP/IP protocol upon receiving a notification from the first processor so as to transmit the message to be transmitted without using the remote direct memory access function, the first processor has a protocol switching function for discriminating difference in a designated protocol so as to switch destination to which an event is notified, and the protocol switching function provides an event notification to the second processor so as to synthesize the message into a packet according to a remote direct memory access protocol if a remote direct memory access protocol is designated, while providing an event notification to the third processor so as to synthesize the message into a TCP/IP packet according to a TCP/IP protocol if a remote direct memory access protocol is not designated.

7. A network protocol processing method comprising:

making a first processor within a multiprocessing unit execute generating a message to be transmitted in a user space and writing the message in a buffer, the first processor being adapted to perform a process on a user level;

making a second processor, which is within the multiprocessing unit and operable to implement a remote direct memory access stack on a kernel level, execute reading from the buffer the message from the first processor, synthesizing the message into a remote direct memory access packet according to a remote direct memory access protocol upon receiving a notification from the first processor, and placing the remote direct memory access packet in a queue; and making a third processor within the multiprocessing unit execute reading the remote direct memory access packet from the buffer that has been queued to be transmitted upon receiving a notification from the second processor so as to synthesize the remote direct memory access packet into a Transmission Control Protocol/Internet Protocol (TCP/IP) packet according to a TCP/IP protocol, the third processor being adapted to perform a TCP/IP protocol processing on a kernel level, wherein:

the third processor is operable to synthesize the message into a TCP/IP packet according to a TCP/IP protocol upon receiving a notification from the first processor so as to transmit the message to be transmitted without using the remote direct memory access function, the first processor has a protocol switching function for discriminating difference in a designated protocol so as to switch destination to which an event is notified, and the protocol switching function provides an event notification to the second processor so as to synthesize the message into a packet according to a remote direct memory access protocol if a remote direct memory access protocol is designated, while providing an event notification to the third processor so as to synthesize the message into a TCP/IP packet according to a TCP/IP protocol if a remote direct memory access protocol is not designated.

8. A network protocol processing method comprising:

making a first processor within the multiprocessing unit execute generating a message to be transmitted in a user space and writing the message in a buffer, the first processor being adapted to perform a process on a user level;

making a second processor, which is within the multiprocessing unit operable to implement a remote direct memory access stack on a kernel level execute reading from the buffer the message from the first processor, synthesizing the message into a remote direct memory access packet according to a remote direct memory access protocol upon receiving a notification from the first processor, and placing the remote direct memory access packet in a queue; and making a third processor within the multiprocessing unit execute reading the remote direct memory access packet from the buffer that has been queued to be transmitted upon receiving a notification from the second processor so as to perform Transmission Control Protocol/Internet Protocol (TCP/IP) protocol processing thereon, the third processor being adapted to perform a TCP/IP offload function inside a network interface card, wherein:

the third processor is operable to synthesize the message into a TCP/IP packet according to a TCP/IP protocol upon receiving a notification from the first processor so as to transmit the message to be transmitted without using the remote direct memory access function, the first processor has a protocol switching function for discriminating difference in a designated protocol so as to switch destination to which an event is notified, and the protocol switching function provides an event notification to the second processor so as to synthesize the message into a packet according to a remote direct memory access protocol if a remote direct memory access protocol is designated, while providing an event notification to the third processor so as to synthesize the message into a TCP/IP packet according to a TCP/IP protocol if a remote direct memory access protocol is not designated.

* * * * *